United States Patent
Shizuka

(10) Patent No.: US 7,923,147 B2
(45) Date of Patent: *Apr. 12, 2011

(54) LAYERED LITHIUM-NICKEL-BASED COMPOUND OXIDE POWDER AND ITS PRODUTION PROCESS

(75) Inventor: Kenji Shizuka, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 548 days.

This patent is subject to a terminal disclaimer.

(21) Appl. No.: 11/979,111

(22) Filed: Oct. 31, 2007

(65) Prior Publication Data

US 2008/0182169 A1    Jul. 31, 2008

Related U.S. Application Data

(63) Continuation of application No. 11/032,113, filed on Jan. 11, 2005, now Pat. No. 7,309,543, which is a continuation of application No. PCT/JP2004/006694, filed on May 12, 2004.

(30) Foreign Application Priority Data

| May 13, 2003 | (JP) | ................................. | 2003-134695 |
| Jun. 27, 2003 | (JP) | ................................. | 2003-185175 |
| Nov. 6, 2003 | (JP) | ................................. | 2003-377140 |
| Feb. 3, 2004 | (JP) | ................................. | 2004-026943 |

(51) Int. Cl.
    *H01M 4/58*    (2010.01)
(52) U.S. Cl. .... 429/207; 429/209; 429/223; 429/231.95
(58) Field of Classification Search .................. 429/207, 429/209, 223, 231.95
    See application file for complete search history.

(56) References Cited

U.S. PATENT DOCUMENTS

2004/0076882 A1    4/2004    Hosoya et al.
(Continued)

FOREIGN PATENT DOCUMENTS

EP    1 207 575 A2    5/2002
(Continued)

OTHER PUBLICATIONS

U.S Appl. No. 12/676,467, filed Mar. 4, 2010, Shizuka, et al.
(Continued)

*Primary Examiner* — Jane Rhee
(74) *Attorney, Agent, or Firm* — Oblon, Spivak, McClelland, Maier & Neustadt, L.L.P.

(57) ABSTRACT

A layered lithium-nickel-based compound oxide powder for a positive electrode material for a high density lithium secondary cell, capable of providing a lithium secondary cell having a high capacity and excellent in the rate characteristics also, is provided.

A layered lithium-nickel-based compound oxide powder for a positive electrode material for a lithium secondary cell, characterized in that the bulk density is at least 2.0 g/cc, the average primary particle size B is from 0.1 to 1 μm, the median diameter A of the secondary particles is from 9 to 20 μm, and the ratio A/B of the median diameter A of the secondary particles to the average primary particle size B, is within a range of from 10 to 200. In production of a layered lithium-nickel-based compound oxide powder, which comprises spray drying a slurry having a nickel compound and a transition metal element compound capable of substituting lithium other than nickel, dispersed in a liquid medium, followed by mixing with a lithium compound, and firing the mixture, the spray drying is carried out under conditions of $0.4 \leq G/S \leq 4$ and $G/S \leq 0.0012V$, when the slurry viscosity at the time of the spray drying is represented by V (cp), the slurry supply amount is represented by S (g/min) and the gas supply amount is represented by G (L/min).

16 Claims, 1 Drawing Sheet

U.S. PATENT DOCUMENTS

| | | |
|---|---|---|
| 2005/0158545 A1 | 7/2005 | Liebermann et al. |
| 2006/0134521 A1 | 6/2006 | Shima |
| 2007/0202405 A1 | 8/2007 | Shizuka et al. |

FOREIGN PATENT DOCUMENTS

| | | |
|---|---|---|
| JP | 9-298062 A | 11/1997 |
| JP | 10-69910 | 3/1998 |
| JP | 10-134811 | 5/1998 |
| JP | 11-25980 A | 1/1999 |
| JP | 11-162466 | 6/1999 |
| JP | 11-246225 | 9/1999 |
| JP | 2003-31219 | 1/2003 |
| JP | 2003-51308 | 2/2003 |
| JP | 2003-68298 | 3/2003 |
| JP | 2003-81639 | 3/2003 |
| JP | 2003-89526 | 3/2003 |
| JP | 2003-95659 | 4/2003 |
| WO | WO 98/06670 A1 | 2/1998 |
| WO | 03/063275 | 7/2003 |

OTHER PUBLICATIONS

U.S. Appl. No. 12/517,813, filed Jun. 5, 2009, Shizuka, et al.
U.S. Appl. No. 11/815,319, filed Aug. 2, 2007, Shizuka, et al.
U.S. Appl. No. 12/296,212, filed Oct. 6, 2008, Shizuka, et al.

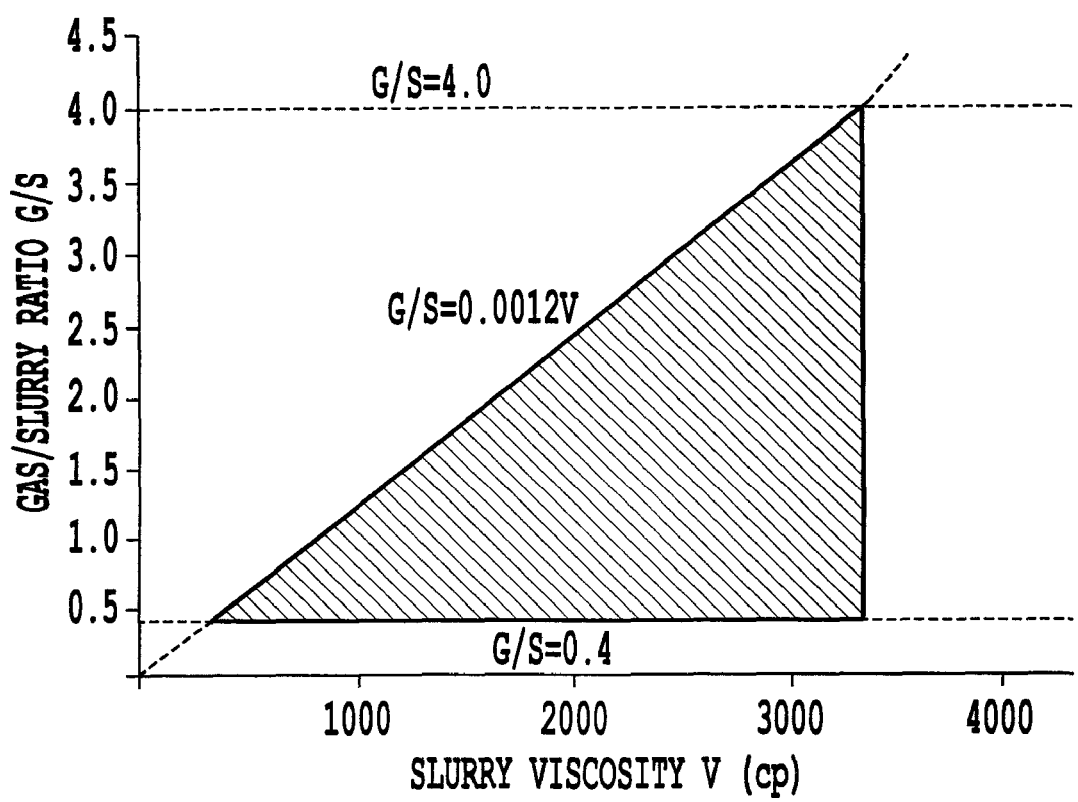

LAYERED LITHIUM-NICKEL-BASED COMPOUND OXIDE POWDER AND ITS PRODUTION PROCESS

CROSS REFERENCES TO RELATED APPLICATIONS

This application is a continuation of U.S. patent application Ser. No. 11/032,113, filed on Jan. 11, 2005, now U.S. Pat. No. 7,309,543, which was a continuation of International Patent Application No. PCT/JP04/06694, filed on May 12, 2004, and claims priority to Japanese Patent Application No. 2003-134695, filed on May 13, 2003, Japanese Patent Application No. 2003-185175, filed on Jun. 27, 2003, Japanese Patent Application No. 2003-377140, filed on Nov. 6, 2003, and Japanese Patent Application No. 2004-026943, filed on Feb. 3, 2004.

TECHNICAL FIELD

The present invention relates to a layered lithium-nickel-based compound oxide powder for a positive electrode material for a lithium secondary cell and its production process, a positive electrode for a lithium secondary cell employing it and a lithium secondary cell. Particularly, the present invention relates to a layered lithium-nickel-based compound oxide powder for a positive electrode material for a high density lithium secondary cell, capable of providing a lithium secondary cell having a high capacity and excellent in rate characteristics, and its production process, a positive electrode for a lithium secondary cell employing it and a lithium secondary cell.

BACKGROUND ART

A lithium secondary cell is excellent in the energy density, the output density etc., and its downsizing and weight reduction are possible, and thus its demand is rapidly increasing as a power source for a portable device such as a notebook computer, a mobile telephone or a handy video camera. A lithium secondary cell attracts attention also as a power source for e.g. an electric automobile or load leveling of the electric power.

A positive electrode employed in a lithium secondary cell is constituted usually by a current collector and a positive electrode active material layer formed on the surface of the current collector, containing a positive electrode active material, an electrically conductive material and a binder. As the positive electrode active material, a compound oxide of lithium and a transition metal, such as lithium/manganese compound oxide, lithium/cobalt compound oxide or lithium/nickel compound oxide, attracts attention since high performance cell characteristics can be obtained. A lithium secondary cell employing such a lithium-based compound oxide has such advantages that a high voltage can be obtained, and that a high output can be obtained.

A layered lithium-nickel-based compound oxide powder as a positive electrode material for a lithium secondary cell is produced usually by spray drying a material slurry containing a lithium material, a nickel compound and a transition metal element compound, and firing the obtained dried particles. Heretofore, in production of a lithium-nickel-based compound oxide powder by this spray drying method, the viscosity of the material slurry is an important factor, and if the viscosity of the material slurry is excessively low taking ejectability from a spray nozzle into consideration, spherical particles are less likely to be formed, and if the viscosity is too high, the nozzle is likely to be clogged. Accordingly, the viscosity of the material slurry is usually set to from 200 to 1000 cp. Further, in view of the industrial productivity and prevention of clogging of the nozzle, the gas supply amount at the time of spray drying is set to be considerably in excess relative to the slurry. In spray drying employing a material slurry having the above-described viscosity, the ratio of the gas supply amount G (L/min) to the slurry supply amount S (g/min), G/S (gas/slurry ratio) is set to at least 5 so that the gas amount is considerably in excess.

DISCLOSURE OF THE INVENTION

However, a lithium-nickel-based compound oxide powder obtained under such spray drying conditions under which the gas amount is considerably in excess has a bulk density of only at most 1.77 g/cc as shown in Comparative Example 1 as described hereinafter, and the packing density in a positive electrode active material layer can not be increased. Accordingly, further improvement of the bulk density is desired as a positive electrode material for a lithium secondary cell.

It is possible to add a sintering aid to the dried particles obtained by spraying drying before firing so as to increase the bulk density of the lithium-nickel-based compound oxide powder. However, in this case, growth of primary particles is promoted, and such a lithium-nickel-based compound oxide powder is employed, cell performances such as rate characteristics and output characteristics tend to be insufficient, such being problematic.

Accordingly, it is an object of the present invention to provide a layered lithium-nickel-based compound oxide powder for a positive electrode material for a lithium secondary cell, capable of providing a lithium secondary cell excellent in rate characteristics and output characteristics even if the secondary particle size is made to be relatively large while suppressing growth of the primary particle size, and a high bulk density is achieved, its production process, a positive electrode for a lithium secondary cell having a high capacity and excellent in cell performances such as rate characteristics employing it, and a lithium secondary cell.

The layered lithium-nickel-based compound oxide powder for a positive electrode material for a lithium secondary cell of the present invention is a layered lithium-nickel-based compound oxide powder for a positive electrode material for a lithium secondary cell, which is represented by the following formula (1), wherein primary particles are agglomerated to form secondary particles, characterized in that the bulk density is at least 2.0 g/cc, the average primary particle size B is from 0.1 to 1 µm, the median diameter A of the secondary particles is from 9 to 20 µm, and the ratio A/B of the median diameter A of the secondary particles to the average primary particle size B, is within a range of from 10 to 200:

$$Li_{1+x}Ni_{1-y-z-p}Mn_yCo_zM_pO_2 \tag{1}$$

wherein $0 \leq x \leq 0.20$, $0.1 \leq y \leq 0.5$, $0.05 \leq z \leq 0.5$, $0 \leq p \leq 0.2$, $0.2 \leq y+z+p \leq 0.8$, and M is at least one member selected from the group consisting of Al, Fe, Ti, Mg, Cr, Ga, Cu, Zn, Nb and Zr.

Namely, as a result of extensive studies, the present inventors have found that a layered lithium-nickel-based compound oxide powder in which growth of the primary particle size is suppressed and the secondary particle size is made to be relatively large, which has a high bulk density and which is excellent in rate characteristics and output characteristics can be obtained by contriving conditions at the time of spray drying, and accomplished the present invention.

The lithium-nickel-based compound oxide powder of the present invention has a high bulk density, and further has a relatively small primary particle size and a large secondary particle size, and thus provides excellent cell performances such as rate characteristics and output characteristics.

Particularly, according to the present invention, a secondary cell excellent in not only initial charge and discharge characteristics but also high-rate discharge characteristics can be provided, as evident from the results of Examples as mentioned hereinafter. The high-rate discharge characteristics are discharge capacity at the time of discharge at a large current, and are characteristics different from the initial discharge. According to the present invention, a high discharge capacity can be obtained even at the time of large current discharge of at least 10 mA/cm$^2$.

In the present invention, the average primary particle size B of the layered lithium-nickel-based compound oxide powder, i.e. the average particle size of the primary particles is measured by a SEM image as observed at 30,000 magnifications. Further, the median diameter A of the secondary particles is measured by a known laser diffraction/scattering type particle size distribution measuring device at a refractivity of 1.24. In the present invention, a 0.1 wt % sodium hexametaphosphate aqueous solution was employed as a dispersion medium to be used for measurement, and the measurement was carried out after ultrasonic dispersion for 5 minutes. Further, the bulk density is a powder packing density (tap density) after about 10 g of the layered lithium-nickel-based compound oxide powder is put in a 10 ml glass measuring cylinder, followed by tapping 200 times.

The BET specific surface area of the layered lithium-nickel-based compound oxide of the present invention is preferably from 0.5 to 1 m$^2$/g.

The process for producing a layered lithium-nickel-based compound oxide powder for a positive electrode material for a lithium secondary cell of the present invention comprises spray drying a slurry having a nickel compound and a metal element compound capable of partially substituting nickel, dispersed in a liquid medium, followed by mixing with a lithium compound, and firing the mixture to produce a layered lithium-nickel-based compound oxide powder for a positive electrode material for a lithium secondary cell, characterized in that when the slurry viscosity at the time of the spray drying is represented by V (cp), the slurry supply amount is represented by S (g/min) and the gas supply amount is represented by G (L/min), the spray drying is carried out under such conditions that the gas/slurry ratio G/S is $0.4 \leq G/S \leq 4$, and the relation between the slurry viscosity V and the gas/slurry ratio G/S is $G/S \leq 0.0012V$.

Namely, under spray drying conditions which are usually employed in a conventional method, when it is attempted to make the secondary particle size of the lithium-nickel-based compound oxide powder to be obtained from about 9 to about 20 μm and relatively large as in the present invention, it is necessary to add a sintering aid or to raise the firing temperature for firing. Resultingly, growth of the primary particles is also accelerated, and accordingly the primary particle size tends to be from about 1 to about 5 μm and large. Further, consequently, the cell performances such as rate characteristics and output characteristics tend to decrease. Further, when it is attempted to decrease the primary particle size to be from 0.1 to 1 μm as in the present invention, it is necessary to set the firing temperature to be low so as to suppress growth of the primary particles. Resultingly, sintering between the secondary particles is also suppressed, and the thus the secondary particle size tends to be from about 4 to about 7 μm, and it tends to be difficult to increase the size larger than this size.

On the contrary, in the present invention, by making the gas/slurry ratio lower than common-sense conditions in a conventional spray drying method, and by maintaining the slurry viscosity, the slurry supply amount and the gas supply amount in a certain relation, the secondary particle size is made to be relatively large while suppressing growth of the primary particle size, and a high bulk density is obtained.

In the present invention, the viscosity of the slurry can be measured by means of a known BM type viscometer. The BM type viscometer is for a measuring method which employs such a method to rotate a predetermined metal rotor in a room temperature atmosphere. The viscosity of the slurry is calculated from the resistance (torsion force) applied to the axis of rotation when the rotor is rotated in such a state that the rotor is immersed in the slurry. The room temperature atmosphere indicates the commonly possible laboratory environment with a temperature of from 10 to 35° C. and a relative humidity of from 20 to 80% RH.

Further, the layered lithium-nickel-based compound oxide powder for a positive electrode material for a lithium secondary cell of the present invention is produced by such a process for producing a layered lithium-nickel-based compound oxide powder for a positive electrode material for a lithium secondary cell of the present invention.

The positive electrode for a lithium secondary cell of the present invention is characterized in that a positive electrode active material layer comprising the layered lithium-nickel-based compound oxide powder for a positive electrode material for a lithium secondary cell of the present invention and a binder, is formed on a current collector.

Further, the lithium secondary cell of the present invention is a lithium secondary cell comprising a negative electrode capable of absorbing and desorbing lithium, a non-aqueous electrolyte containing a lithium salt and a positive electrode capable of absorbing and desorbing lithium, characterized in that the positive electrode for a lithium secondary cell of the present invention is used as the positive electrode.

BRIEF DESCRIPTION OF THE DRAWING

FIG. 1 is a graph illustrating the relation between the gas/slurry ratio G/S and the slurry viscosity V (cp) at the time of the spray drying.

BEST MODE FOR CARRYING OUT THE INVENTION

Now, the embodiments of the present invention will be explained in detail below.

First, the layered lithium-nickel-based compound oxide powder for a positive electrode material for a lithium secondary cell of the present invention will be explained below.

The layered lithium-nickel-based compound oxide powder for a positive electrode material for a lithium secondary cell of the present invention is a layered lithium-nickel-based compound oxide powder wherein primary particles are agglomerated to form secondary particles, characterized in that the bulk density is at least 2.0 g/cc, the average primary particle size B is from 0.1 to 1 μm, the median diameter A of the secondary particles is from 9 to 20 μm, and the ratio A/B of the median diameter A of the secondary particles to the average primary particle size B, is within a range of from 10 to 200.

The layered lithium-nickel-based compound oxide powder of the present invention can meet the demand for a high bulk density of at least 2.0 g/cc. Particularly, a bulk density of at least 2.2 g/cc can be realized. The upper limit is preferably as high as possible, but is usually about 3 g/cc.

Further, if the average primary particle size B of the layered lithium-nickel-based compound oxide powder of the present invention is lower than the above lower limit, there may be a problem such that reversibility of charge and discharge tends to be poor, since crystals are not developed. Further, if it exceeds the upper limit, spherical secondary particles are hardly formed, and the powder packing properties may be impaired, or the specific surface area greatly decreases, whereby there is a high possibility that the cell performances such as the rate characteristics and the output characteristics decrease, such being unfavorable. Accordingly, the average primary particle size B is at least 0.1 µm, preferably at least 0.2 µm, and at most 1 µm, preferably at most 0.6 µm. The primary particle size B as defined in the present invention means the primary particle size of the layered lithium-nickel-based compound oxide powder obtained by firing.

Further, if the median diameter A of the secondary particles of the layered lithium-nickel-based compound oxide powder of the present invention is lower than the above lower limit, there is a fear that a high bulk density product as defined in the present invention may not be obtained. Further, if it exceeds the upper limit, the cell characteristics may decrease, or there may be a problem in coating properties at the time of the formation of the positive electrode active material layer, such being unfavorable. Accordingly, the median diameter A of the secondary particles is at least 9 µm, preferably at least 10 µm, and at most 20 µm, preferably at most 15 µm. The median diameter A of the secondary particles as defined in the present invention means the median diameter A of the secondary particles of the layered lithium-nickel-based compound oxide powder obtained by firing.

Further, the ratio A/B of the median diameter A of the secondary particles to the average primary particle size B represents the tendency of the secondary particle size and the primary particle size of the positive electrode active material powder, and the ratio A/B being from 10 to 200 indicates that the powder characteristics such as the bulk density and the cell characteristics such as the rate are in a well-balanced favorable state. If the ratio A/B is lower than the above lower limit, spherical secondary particles are hardly formed, whereby the powder packing properties are likely to decrease, and if it is higher than the upper limit, the packing properties of the primary particles forming the secondary particles tend to be too high, and the cell characteristics tend to decrease. Accordingly, A/B is at least 10, preferably at least 15, more preferably at least 30, and at most 200, preferably at most 150, more preferably at most 100.

The lithium-nickel-based compound oxide of the present invention provides remarkable effects in the form of a lithium-nickel-manganese-cobalt compound oxide, and especially one represented by the following formula (1):

$$Li_{1+x}Ni_{1-y-z-p}Mn_yCo_zM_pO_2 \quad (1)$$

wherein $0 \leq x \leq 0.20$, $0.1 \leq y \leq 0.5$, $0.05 \leq z \leq 0.5$, $0 \leq p \leq 0.2$, $0.2 \leq y+z+p \leq 0.8$, and M is at least one member selected from the group consisting of Al, Fe, Ti, Mg, Cr, Ga, Cu, Zn, Nb and Zr.

In the above formula (I), the lower limit of x is usually at least 0, preferably at least 0.01, more preferably at least 0.02, and the upper limit is usually at most 0.20, preferably at most 0.15, more preferably at most 0.10. When x exceeds 0 so that the Li proportion is within a range slightly higher than the stoichiometrical composition, the cell performances (particularly the rate characteristics and the output characteristics) further improve, such being favorable. The reason is not clear, however, it is estimated as follows. The valency of Ni changes (Ni(II)→Ni(III)) accompanying the transition metal site (3b) substitution of the excess Li, whereby the proportion of Ni(III)/Ni(II) increases (the Ni average valency increases) and as a result, the electronic state of the crystals changes, and the electrical conductivity improves (the resistivity decreases). In addition, the Li site (3a) substitution amount (occupation ratio) of Ni(II) decreases, whereby the disorder of the crystal structure is suppressed, and Li ions smoothly diffuse. If the value of x is lower than the lower limit, an unreacted product may remain, or the crystal structure tends to be unstable, and if it exceeds the upper limit, a hetero-phase is likely to form, or the amount of Li substituted by the transition metal site tends to be too large, and the performance of a lithium secondary cell using this oxide powder may decrease.

Further, the lower limit of y is usually at least 0.1, preferably at least 0.2, and the upper limit is usually at most 0.5, preferably at most 0.4. If y is lower than the lower limit, the merit of safety when the oxide powder is used for a cell is less likely to be brought about, and if it exceeds the upper limit, the synthesis of a single phase may be difficult.

Further, the lower limit of z is usually at least 0.05, preferably at least 0.1, more preferably at least 0.2, and the upper limit is usually at most 0.5, preferably at most 0.4. If z is lower than the lower limit, the synthesis may be difficult, and if it exceeds the upper limit, there may be disadvantages in the safety of the cell and the cost.

Further, the lower limit of p is usually at least 0, preferably at least 0.01, and the upper limit is usually at most 0.2, preferably at most 0.1. If p is higher than the upper limit, the capacity when the oxide powder is used for an electrode for a cell may decrease, or the powder properties of the present invention may hardly be obtained.

Further, the lower limit of y+z+p is usually at least 0.2, preferably at least 0.3, and the upper limit is usually at most 0.8, preferably at most 0.7. If y+z+p is lower than the lower limit, the synthesis may be difficult, or the chemical stability tends to decrease, such that the oxide powder deteriorates e.g. by absorbing a carbonic acid gas at the time of storage, and if it exceeds the upper limit, the decrease in the capacity when the oxide powder is used for a cell tends to be remarkable.

The substituting element M is at least one member selected from the group consisting of Al, Fe, Ti, Mg, Cr, Ga, Cu, Zn, Nb and Zr. Particularly preferred is one having properties capable of suppressing the growth of the primary particles, and preferred as M is Al with a view to suppressing the growth of the primary particles.

Further, the layered lithium-nickel-based compound oxide powder of the present invention preferably has a BET specific surface area of at least 0.5 m²/g, particularly at least 0.6 m²/g, and at most 2.0 m²/g, particularly at most 1.0 m²/g. If the BET specific surface area is smaller than this range, the cell performance is likely to decrease, and if it is larger than this range, a problem in coating properties at the time of the formation of the positive electrode active material layer is likely to arise.

Particularly, the layered lithium-nickel-based compound oxide powder of the present invention is produced preferably by a spray drying method, and especially by having the following characteristics in shape obtained by the spray drying method, a still higher performance can be obtained.

Namely, it is preferred that the orientation properties of the primary particles forming the secondary particles are low as observed by a sectional SEM. This indicates that the primary particle crystals are randomly agglomerated to form secondary particles, and the secondary particles have substantially no crystal anisotropy. Accordingly, the expansion and shrinkage of the crystals accompanying absorption and desorption of lithium ions are relieved in the secondary particles, and the cycle reversibility as the cell characteristics becomes excellent. By combination of the low orientation properties of the primary particles forming the secondary particles and the effect by defining the substances of the present invention, various cell characteristics improved in a well-balanced manner, in addition to a higher density as compared with a conventional product, can be obtained.

The process for producing such a layered lithium-nickel-based compound oxide powder for a positive electrode material for a lithium secondary cell of the present invention is not particularly limited, however, it is produced preferably by the process for producing a layered lithium-nickel-based compound oxide powder for a positive electrode material for a lithium secondary cell of the present invention as follows.

Namely, in production of a layered lithium-nickel-based compound oxide powder comprising spray drying a slurry having a nickel compound and a metal element compound capable of partially substituting nickel, dispersed in a liquid medium, followed by mixing with a lithium compound, and firing the mixture, the spray drying is carried out under such conditions that when the slurry viscosity at the time of the spray drying is represented by V (cp), the slurry supply amount is represented by S (g/min) and the gas supply amount is represented by G (L/min), the gas/slurry ratio G/S is $0.4 \leqq G/S \leqq 4$, and the relation between the slurry viscosity V and the gas/slurry ratio G/S is $G/S \leqq 0.0012V$.

If the gas/slurry ratio G/S is lower than the above lower limit, the drying properties may decrease or the nozzle is likely to be clogged, and if it exceeds the upper limit, it is necessary to use a high viscosity slurry so as to obtain the particle properties as defined in the present invention and as a result, the nozzle is likely to be clogged. Accordingly, the gas/slurry ratio G/S is at least 0.4, preferably at least 0.5, and at most 4, preferably at most 2, more preferably at most 1.5.

If the relation between the slurry viscosity V (cp) and the gas/slurry ratio G/S is $G/S > 0.0012V$, the gas/slurry ratio is too high relative to the slurry viscosity, and thus the effect of the present invention such that by setting the gas/slurry ratio to be low, the secondary particle size is made to be relatively large while suppressing the growth of the primary particle size, and further a high bulk density is obtained, can not be obtained. Accordingly, $G/S \leqq 0.0012V$.

As mentioned above, in the process of the present invention, the spray drying is carried out under such conditions that the gas/slurry ratio G/S is $0.4 \leqq G/S \leqq 4$, and the relation between the slurry viscosity V (cp) and the gas/slurry ratio G/S is $G/S \leqq 0.0012V$. The spray drying conditions are in the shaded region in the graph illustrating V by the horizontal axis and G/S by the vertical axis as shown in FIG. 1. In the shaded region, in the lower right region, i.e. when the slurry viscosity V is high, the gas/slurry ratio G/S is low and α is small in the relational formula $G/S = \alpha V$, the median diameter A of the secondary particles of the obtained powder tends to be large, and further, the bulk density tends to increase.

With respect to the spray drying conditions employed in the present invention, the lower limit of α in $G/S = \alpha V$ can not generally defined in view of other conditions, and is optionally set so that a powder having a median diameter A of the secondary particles of at most 20 μm can be obtained. In view of e.g. operation properties, preferably α is at least 0.0004 and at most 0.0010.

In the present invention, the viscosity V (cp) of the slurry to be subjected to the spray drying is too low, spherical particles may hardly be formed, and if it is too high, the supply pump may break or the nozzle may be clogged. Accordingly, the slurry viscosity V (cp) is preferably at least 350 cp, particularly at least 500 cp, and at most 3000 cp, especially at most 1500 cp, particularly at most 1200 cp.

The slurry supply amount S and the gas supply amount G are optionally set depending upon the viscosity of the slurry to be subjected to the spray drying and the specifications of the spray drying apparatus, and can not generally be defined. However, the lower limit of the slurry supply amount S (g/min) is usually at least 10, preferably at least 20, and the upper limit is usually at most 45, preferably at most 40. If it is lower than the lower limit, the productivity may be impaired, and if it exceeds the upper limit, the drying may hardly be carried out. Further, the lower limit of the gas supply amount G (L/min) is usually at least 20, preferably at least 25, and the upper limit is usually at most 45, preferably at most 40. If it is lower than the lower limit, the drying properties may decrease or the nozzle is likely to be clogged, and if it exceeds the upper limit, the secondary particles may hardly be formed.

In the process of the present invention, the spray drying may be carried out within a range satisfying the above-described gas/slurry ratio G/S and relational formula of the gas/slurry ratio G/S and the slurry viscosity V, preferably within a range of the above-described slurry viscosity, slurry supply amount and gas supply amount. The other conditions are optionally determined depending upon e.g. the type of the apparatus to be used, and it is preferred to further select the following conditions.

Namely, the spray drying of the slurry is carried out preferably at a temperature of usually at least 50° C., preferably at least 70° C., furthermore preferably at least 120° C., and usually at most 300° C., preferably at most 250° C., furthermore preferably at most 200° C. If this temperature is too high, there is a possibility that a large part of the obtained granulated particles have a hollow structure, whereby the packing density of the powder tends to decrease. On the other hand, if it is too low, there is a possibility that problems such as powder fixation and clogging due to moisture condensation at the powder outlet portion may arise.

Further, the gas flow let out from the spray nozzle is preferably ejected at a gas linear velocity of usually at least 100 m/sec, preferably at least 200 m/sec. If the gas linear velocity is too low, appropriate droplets are less likely to be formed. However, a very high linear velocity is hardly obtained, and thus the ejection velocity is usually at most 1000 m/sec.

Further, in production of the layered lithium-nickel-based compound oxide powder by the process of the present invention, among raw material compounds to be used for preparation of the slurry, the nickel compound may, for example, be $Ni(OH)_2$, $NiO$, $NiOOH$, $NiCO_3 \cdot 2Ni(OH)_2 \cdot 4H_2O$, $NiC_2O_4 \cdot 2H_2O$, $Ni(NO_3)_2 \cdot 6H_2O$, $NiSO_4$, $NiSO_4 \cdot 6H_2O$, fatty acid nickel or a nickel halide. Among them, preferred is a nickel compound containing no nitrogen atom nor sulfur atom, such as $Ni(OH)_2$, $NiO$, $NiOOH$, $NiCO_3 \cdot 2Ni(OH)_2 \cdot 4H_2O$ or $NiC_2O_4 \cdot 2H_2O$, with a view to not generate harmful substances such as $NO_x$ or $SO_x$ at the time of the firing treatment. Further, particularly preferred are $Ni(OH)_2$, $NiO$ and $NiOOH$ in view of availability at a low cost as industrial materials and high reactivity. These nickel compounds may be used alone or at least two types may be used in combination.

Further, the manganese compound may, for example, be a manganese oxide such as $Mn_2O_3$, $MnO_2$ or $Mn_3O_4$, a manganese salt such as $MnCO_3$, $Mn(NO_3)_2$, $MnSO_4$, manganese acetate, manganese dicarboxylate, manganese citrate or fatty acid manganese, an oxyhydroxide or a halide such as manganese chloride. Among these manganese compounds, preferred are $MnO_2$, $Mn_2O_3$ and $Mn_3O_4$ since they do not generate a gas such as $NO_x$, $SO_x$ or $CO_2$ at the time of the firing treatment, and they are available as industrial materials at a low cost. These manganese compounds may be used alone or at least two types may be used in combination.

Further, the cobalt compound may, for example, be $Co(OH)_2$, $CoO$, $Co_2O_3$, $Co_3O_4$, $CoOOH$, $Co(OCOCH_3)_2 \cdot 4H_2O$, $CoCl_2$, $Co(NO_3)_2 \cdot 6H_2O$ or $Co(SO_4)_2 \cdot 7H_2O$. Among them, $Co(OH)_2$, $CoO$, $Co_2O_3$ and $Co_3O_4$ are preferred with a view to not generating harmful substances such as $NO_x$ or $SO_x$ at the time of the firing step. More preferred is $Co(OH)_2$ in view of industrial availability at a low cost and high reactivity. These cobalt compounds may be used alone or at least two types may be used in combination.

Further, the substituting element source represented by M in the above formula (I) (hereinafter sometimes referred to as "substituting metal compound") may, for example, be an oxyhydroxide, oxide, hydroxide or halide of a substituting metal, an inorganic acid salt such as a carbonate, a nitrate or a sulfate, or an organic acid salt such as a monocarboxylic acid salt such as an acetate or an oxalate, a dicarboxylic acid salt or a fatty acid salt.

Further, the dispersion medium to be used for the preparation of the slurry, various organic solvents and aqueous solvents may be used, and preferred is water. The total weight ratio of the nickel compound and other raw material compounds based on the total weight of the slurry is preferably at least 10 wt %, particularly at least 12.5 wt %, and at most 50 wt %, particularly at most 35 wt %, within the above-described slurry viscosity range. If the weight ratio is less than the above range, the slurry concentration is extremely low, and thus the spherical particles formed by the spray drying may be unnecessarily small or are likely to be broken. If the weight ratio exceeds the above range, the uniformity of the slurry is hardly maintained.

The average particle size of the solid material in the slurry is preferably usually at most 2 μm, particularly at most 1 μm, especially at most 0.5 μm. If the average particle size of the solid material in the slurry is too large, not only the reactivity in the firing step decreases, but also the sphericity tends to decrease and the final powder packing density tends to decrease. However, to make the average particle size be small more than required leads to increase in the cost for pulverization, and thus the average particle size of the solid material is usually at least 0.01 μm, preferably at least 0.05 μm, furthermore preferably at least 0.1 μm.

As the method for controlling the average particle size of the solid material in the slurry, a method of preliminarily dry grinding the raw material compounds by e.g. a ball mill or a jet mill, and dispersing them in a dispersion medium by e.g. stirring, or a method of dispersing the raw material compounds in a dispersion medium by e.g. stirring, followed by wet grinding by using a medium stirring type grinding machine, may, for example, be mentioned. Particularly, it is preferred to employ the method of dispersing the raw material compounds in a dispersion medium, followed by wet grinding by using e.g. a medium stirring type grinding machine.

As the gas to be supplied at the time of the spray drying of the slurry, the air, nitrogen or the like may be employed, and usually the air is employed. It is used preferably as pressurized.

The lithium compound to be mixed with the granulated particles obtained by the spray drying may, for example, be $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, lithium acetate, lithium dicarboxylate, lithium citrate, fatty acid lithium, an alkyl lithium or a lithium halide. Among these lithium compounds, preferred is a lithium compound containing no nitrogen atom nor sulfur atom, with a view to not generating harmful substances such as $NO_x$ or $SO_x$ at the time of the firing treatment, and $LiOH$ and $LiOH \cdot H_2O$ are preferred. These lithium compounds may be used alone or at least two types may be used in combination.

As the particle size of such a lithium compound, in order to increase the miscibility with the dried product obtained by the spray drying and to improve the cell performance, the average particle size is usually at most 500 μm, preferably at most 100 μm, furthermore preferably at most 50 μm, most preferably at most 20 μm. On the other hand, a compound having a very small particle size has a low stability in the air, and thus the average particle size is usually at least 0.01 μm, preferably at least 0.1 μm, furthermore preferably at least 0.2 μm, most preferably at least 0.5 μm.

The means to mix the lithium compound with the spray dried particles is not particularly limited, but it is preferred to employ a powder mixing apparatus which is commonly used industrially. The atmosphere in the system in which the mixing is carried out is preferably an inert gas atmosphere so as to prevent absorption of carbonic acid in the air.

The mixed powder thus obtained is then subjected to a firing treatment. The firing conditions depend on the raw material composition, but if the firing temperature is too high, the primary particles tend to grow too much, and if it is too low, the bulk density tends to be low, and the specific surface area tends to be too large.

Although the firing temperature varies depending upon the type of the lithium compound and other metal compounds etc. to be used as the raw materials, but it is usually at least 700° C., preferably at least 725° C., more preferably at least 750° C., furthermore preferably at least 800° C., and usually at most 1050° C., preferably at most 1000° C.

The firing time varies depending upon the temperature, and it is usually at least 30 minutes within the above-described temperature range, preferably at least 5 hours, furthermore preferably at least 10 hours. Further, it is usually at most 50 hours. If the firing time is too short, a lithium-nickel-based compound oxide powder having good crystallinity is less likely to be obtained, and a too long firing time is not practical. If the firing time is too long, pulverization may be required after the firing, or the pulverization tends to be difficult, and accordingly it is preferably at most 25 hours, furthermore preferably at most 20 hours.

The atmosphere at the time of the firing may be an oxygen-containing gas atmosphere such as the air or an inert gas atmosphere of e.g. nitrogen or argon, depending upon the composition or the structure of the compound to be produced.

Now, the positive electrode for a lithium secondary cell of the present invention will be explained below.

The positive electrode for a lithium secondary cell of the present invention comprises a positive electrode active material layer comprising the layered lithium-nickel-based compound oxide powder for a positive electrode material for a lithium secondary cell of the present invention and a binder, formed on a current collector.

The positive electrode active material layer is prepared usually by contact bonding a sheet obtained by dry mixing a positive electrode material and a binder, and an electrically conductive material, a thickener etc. which are used as the case requires, on a positive electrode current collector, or by dissolving or dispersing such materials in a liquid medium to obtain a slurry, and coating a positive electrode current collector with the slurry, followed by drying.

As the material of the positive electrode current collector, usually a metal material such as aluminum, stainless steel, nickel plated metal, titanium or tantalum, or a carbon material such as carbon cloth or carbon paper may be employed. Among them, a metal material is preferred, and aluminum is particularly preferred. Further, as its shape, in the case of the metal material, a metal foil, a metal cylinder, a metal coil, a metal plate, a metal thin film, an expanded metal, a punching metal or a foam metal may, for example, be mentioned, and in the case of the carbon material, a carbon plate, a carbon thin film or a carbon cylinder may, for example, be mentioned. Among them, a metal thin film is preferred since it is used for an industrial product at present. Further, a thin film may optionally be formed to have a mesh form.

In a case where a thin film is used as the positive electrode current collector, the thickness is optional, but it is usually at least 1 μm, preferably at least 3 μm, more preferably at least 5 μm, and usually at most 100 mm, preferably at most 1 mm, more preferably at most 50 μm. If it is thinner than the above range, the strength required as a current collector may be insufficient, and on the other hand, if it is thicker than the above range, handling properties may be impaired.

The binder to be used for the production of the positive electrode active material layer is not particularly limited, and in the case of the coating method, it may be a material stable against the liquid medium used for the production of the electrode. As the specific example, a resin type polymer such as polyethylene, polypropylene, polyethylene terephthalate, polymethyl methacrylate, an aromatic polyamide, cellulose or nitrocellulose, a rubber-like polymer such as SBR (styrene-butadiene rubber), NBR (acrylonitrile-butadiene rubber), fluororubber, isoprene rubber, butadiene rubber or ethylene/propylene rubber, a thermoplastic elastomer polymer such as a styrene/butadiene/styrene block copolymer and its hydrogenated product, EPDM (ethylene-propylene-diene terpolymer), a styrene/ethylene/butadiene/ethylene copolymer or a styrene/isoprene/styrene block copolymer and its hydrogenated product, a flexible resin polymer such as sindiotactic-1,2-polybutadiene, polyvinyl acetate, an ethylene/vinyl acetate copolymer or a propylene/α-olefin copolymer, a fluorine type polymer such as polyvinylidene fluoride, polytetrafluoroethylene, fluorinated polyvinylidene fluoride or a polytetrafluoroethylene/ethylene copolymer or a polymer composition having ion conductivity of alkali metal ions (particularly lithium ions). These materials may be used alone or a plurality of these may be used in an optional combination in an optional proportion.

The proportion of the binder in the positive electrode active material layer is usually at least 0.1 wt %, preferably at least 1 wt %, furthermore preferably at least 5 wt %, and usually at most 80 wt %, preferably at most 60 wt %, furthermore preferably at most 40 wt %, most preferably at most 10 wt %. If the proportion of the binder is too small, the positive electrode active material may not adequately be maintained and the mechanical strength of the positive electrode is insufficient, whereby the cell performance such as the cyclic durability may deteriorate, and on the other hand, if it is too large, the cell capacity or the electrical conductivity may decrease.

In the positive electrode active material layer, an electrically conductive material is usually contained so as to increase the electrical conductivity. The type is not particularly limited, but as the specific example, a metal material such as copper or nickel, or a carbon material such as graphite such as natural graphite or artificial graphite, carbon black such as acetylene black or amorphous carbon such as needle coke may, for example, be mentioned. Such materials may be used alone or at least two types may be used in an optional combination in an optional proportion. The proportion of the electrically conductive material in the positive electrode active material layer is usually at least 0.01 wt %, preferably at least 0.1 wt %, furthermore preferably at least 1 wt %, and usually at most 50 wt %, preferably at most 30 wt %, furthermore preferably at most 15 wt %. If the proportion of the electrically conductive material is too small, the electrical conductivity may be insufficient, and on the other hand, if it is too large, the cell capacity may decrease in some cases.

The liquid medium for formation of the slurry is not particularly limited so long as it is a solvent capable of dissolving or dispersing the lithium-nickel-based compound oxide powder as the positive electrode material and the binder, and the electrically conductive material and the thickener which are used as the case requires, and either an aqueous solvent or an organic solvent may be used. The aqueous solvent may, for example, be water or an alcohol, and the organic solvent may, for example, be N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphoramide, dimethylsulfoxide, benzene, xylene, quinoline, pyridine, methylnaphthalene or hexane. Particularly when an aqueous solvent is used, a dispersing agent is added in addition to the thickener, and a latex such as SBR is used to obtain a slurry. Such solvents may be used alone or at least two types may be used in an optional combination in an optional proportion.

The content of the layered lithium-nickel-based compound oxide powder of the present invention as the positive electrode material in the positive electrode active material layer is usually at least 10 wt %, preferably at least 30 wt %, furthermore preferably at least 50 wt %, and usually at most 99.9 wt %, preferably at most 99 wt %. If the proportion of the layered lithium-nickel-based compound oxide powder in the positive electrode active material layer is too large, the strength of the positive electrode tends to be insufficient, and if it is too small, the capacity may be insufficient in some cases.

Further, the thickness of the positive electrode active material layer is usually from about 10 to about 200 μm.

The positive electrode active material layer obtained by coating and drying is preferably subjected to compaction treatment by means of e.g. a roller press so as to increase the packing density of the positive electrode active material.

Now, the lithium secondary cell of the present invention will be explained below.

The lithium secondary cell of the present invention comprises the above positive electrode for a lithium secondary cell of the present invention capable of absorbing and desorbing lithium, a negative electrode capable of absorbing and desorbing lithium and a non-aqueous electrolyte comprising a lithium salt as the electrolytic salt. Further, it may have a separator to maintain the non-aqueous electrolyte between the positive electrode and the negative electrode. In order to effectively prevent short circuiting by the contact of the positive electrode with the negative electrode, a separator is preferably interposed therebetween.

The negative electrode is constituted usually by forming a negative electrode active material layer on a negative electrode current collector in the same manner as for the positive electrode.

As the material of the negative electrode current collector, a metal material such as copper, nickel, stainless steel or nickel plated steel or a carbon material such as carbon cloth or carbon paper may be employed. Among them, in the case of a metal material, a metal foil, a metal cylinder, a metal coil, a metal plate or a metal thin film may, for example, be mentioned, and in the case of a carbon material, a carbon plate, a carbon thin film or a carbon cylinder may, for example, be mentioned. Among them, a metal thin film is preferred since it is used for an industrial product at present. A thin film may optionally be formed to have a mesh form. In a case where a metal thin film is used as the negative electrode current collector, the range of the preferred thickness is the same as the above-described range for the positive electrode current collector.

The negative electrode active material layer is constituted containing a negative electrode active material. The type of the negative electrode active material is not particularly limited so long as it is capable of electrochemically absorbing and desorbing lithium ions, but usually a carbon material capable of absorbing and desorbing lithium is used in view of high safety.

The type of the carbon material is not particularly limited, and graphite such as artificial graphite or natural graphite or a pyrolytically decomposed organic matter under various pyrolysis conditions may be mentioned. The pyrolytically decomposed organic matter may, for example, be coal-based coke, petroleum-based coke, a carbonized material of coal-based pitch, a carbonized product of petroleum-based pitch, a carbonized material obtained by subjecting such pitch to oxidation treatment, needle coke, pitch coke, a carbonized material of e.g. a phenol resin or crystalline cellulose or a carbon material obtained by partially graphitizing it, furnace black, acetylene black or pitch-based carbon fiber. Among them, graphite is preferred. Particularly preferably, artificial graphite, purified natural graphite or a graphite material containing pitch in such graphite, which is produced by applying a high temperature heat treatment to easily graphitizable pitch obtained from various raw materials, to which various surface treatments are applied, is mainly used. Such carbon materials may be used alone or at least two types may be used in combination.

In a case where a graphite material is used as the negative electrode active material, preferred is one having a d value (interlayer distance) of the lattice plane (002 plane) as obtained by X-ray diffraction by means of Gakushin method (method as stipulated by Japan Society for the Promotion of Science) of usually at least 0.335 nm and usually at most 0.34 nm, preferably at most 0.337 nm.

Further, the ash content of the graphite material is preferably usually at most 1 wt %, especially at most 0.5 wt %, particularly at most 0.1 wt %, based on the weight of the graphite material.

Further, the crystallite size (Lc) of the graphite material obtained by X-ray diffraction by means of the Gakushin method is preferably usually at least 30 nm, especially at least 50 nm, particularly at least 100 nm.

Further, the median diameter of the graphite material obtained by laser diffraction/scattering method is preferably usually at least 1 μm, especially at least 3 μm, furthermore at least 5 μm, particularly at least 7 μm, and usually at most 100 μm, especially at most 50 μm, furthermore at most 40 μm, particularly at most 30 μm.

Further, the specific surface area by the BET method of the graphite material is usually at least 0.5 m$^2$/g, preferably at least 0.7 m$^2$/g, more preferably at least 1.0 m$^2$/g, furthermore preferably at least 1.5 m$^2$/g, and usually at most 25.0 m$^2$/g, preferably at most 20.0 m$^2$/g, more preferably at most 15.0 m$^2$/g, furthermore preferably at most 10.0 m$^2$/g.

Further, preferred is one having an intensity ratio of the intensity $I_A$ of the peak $P_A$ detected within a range of from 1580 to 1620 cm$^{-1}$ to the intensity $I_B$ of the peak $P_B$ detected within a range of from 1350 to 1370 cm$^{-1}$, $I_A/I_B$, of at least 0 and at most 0.5, when Raman spectrum analysis by means of an argon laser beam is carried out with respect to the graphite material. Further, the half value width of the peak $P_A$ is preferably at least 26 cm$^{-1}$, more preferably at most 25 cm$^{-1}$. In addition to the above-described various carbon materials, another material capable of absorbing and desorbing lithium may be used as the negative electrode active material. As a specific example of the negative electrode active material other than the carbon material, a metal oxide such as tin oxide or silicon oxide, lithium simple substance or a lithium alloy such as lithium-aluminum alloy may, for example, be mentioned. Such materials other than the carbon material may be used alone or at least two types may be used in combination. Further, they may be used in combination with the above-described carbon material.

The negative electrode active material layer may be produced, usually in the same manner as the case of the positive electrode active material layer, by coating a negative electrode current collector with one comprising the above-described negative electrode active material and a binder, and as the case requires, an electrically conductive material and a thickener, slurried with a liquid medium, followed by drying. As the liquid medium to form the slurry, the binder, the thickener, the electrically conductive material etc., ones similar to those described above for the positive electrode active material layer may be used.

As the electrolyte, for example, a known organic electrolytic solution, polymer solid electrolyte, gel electrolyte or inorganic solid electrolyte may, for example, be used. Among them, an organic electrolytic solution is preferred. The organic electrolytic solution comprises a solute (electrolyte) dissolved in an organic solvent.

The type of the organic solvent is not particularly limited, but a carbonate, an ether, a ketone, a sulfolane compound, a lactone, a nitrile, a chlorinated hydrocarbon, an ether, an amine, an ester, an amide or a phosphate compound may, for example, be used. As representative examples, dimethyl carbonate, diethyl carbonate, propylene carbonate, ethylene carbonate, vinylene carbonate, tetrahydrofuran, 2-methyltetrahydrofuran, 1,4-dioxane, 4-methyl-2-pentanone, 1,2-dimethoxyethane, 1,2-diethoxyethane, γ-butyrolactone, 1,3-dioxolane, 4-methyl-1,3-dioxolane, diethyl ether, sulfolane, methylsulfolane, acetonitrile, propionitrile, benzonitrile, butyronitrile, valeronitrile, 1,2-dichloroethane, dimethylformamide, dimethylsulfoxide, trimethyl phosphate or triethyl phosphate may, for example, be mentioned, and they may be used alone or a mixed solvent of at least two types thereof may be used.

It is preferred to incorporate a high dielectric constant solvent in the above-described organic solvent so as to dissociate the electrolytic salt. The high dielectric constant solvent means a compound having a relative dielectric constant of at least 20 at 25° C. Among the high dielectric constant solvents, ethylene carbonate, propylene carbonate or a compound having a hydrogen atom of such a carbonate substituted by another element such as halogen, an alkyl group or the like is preferably contained in the electrolytic solution. The proportion of the high dielectric constant solvent in the electrolytic solution is preferably at least 20 wt %, more preferably at least 30 wt %, most preferably at least 40 wt %. If the content of the high dielectric constant solvent is lower than the above range, no desired cell characteristics may be obtained in some cases.

The type of the electrolytic salt is not particularly limited, and a known optional solute may be used. As a specific example, LiClO$_4$, LiAsF$_6$, LiPF$_6$, LiBF$_4$, LiB(C$_6$H$_5$)$_4$, LiCl, LiBr, CH$_3$SO$_3$Li, CF$_3$SO$_3$Li, LiN(SO$_2$CF$_3$)$_2$, LiN(SO$_2$C$_2$F$_5$)$_2$, LiC(SO$_2$CF$_3$)$_3$ or LiN(SO$_3$CF$_3$)$_2$ may, for example, be mentioned. As such an electrolytic salt, optional one type may be used alone, or at least two types may be used in an optional combination in an optional proportion. Further, an additive to form on the surface of the negative electrode a favorable coating film which makes efficient charge and discharge of lithium ions possible, such as a gas such as $CO_2$, $N_2O$, CO or $SO_2$, or polysulfide $S_x^{2-}$, may be added in an optional proportion.

The lithium salt as the electrolytic salt is contained in the electrolytic solution at a concentration of usually at least 0.5 mol/L and at most 1.5 mol/L. The electrical conductivity decreases if it is less than 0.5 mol/L or higher than 1.5 mol/L, and the cell characteristics may be impaired in some cases. The lower limit is preferably at least 0.75 mol/L, and the upper limit is preferably at most 1.25 mol/L.

In a case where a polymer solid electrolyte is used also, the type is not particularly limited, and an optional crystalline or amorphous inorganic material which is known as a solid electrolyte may be used. The crystalline inorganic solid electrolyte may, for example, be LiI, $Li_3N$, $Li_{1+x}J_xTi_{2-x}(PO_4)_3$ (J=Al, Sc, Y or La) or $Li_{0.5-3x}RE_{0.5+x}TiO_3$ (RE=La, Pr, Nd or Sm). Further, the amorphous inorganic solid electrolyte may, for example, be oxide glass such as $4.9LiI-34.1Li_2O-61B_2O_5$ or $33.3Li_2O-66.7SiO_2$. Optional one type may be used alone or at least two types may be used in an optional combination in an optional proportion.

In a case where the above-described organic electrolytic solution is used as the electrolyte, a separator is interposed between the positive electrode and the negative electrode so as to prevent short circuiting between the electrodes. The material and the shape of the separator are not particularly limited, but preferred is one which is stable against the organic electrolytic solution used, which is excellent in the liquid-holding property and which can securely prevent short circuiting between the electrodes. As a preferred example, a fine porous film, sheet or nonwoven fabric comprising a polymer material may, for example, be mentioned. As a specific example of the polymer material, nylon, cellulose acetate, nitrocellulose, polysulfone, polyacrylonitrile, polyvinylidene fluoride or a polyolefin polymer such as polypropylene, polyethylene or polybutene may be used. Particularly, a polyolefin type polymer is preferred in view of chemical and electrochemical stability which is an important factor of the separator, and polyethylene is particularly desirable in view of the self clogging temperature which is one of the purposes of use of the separator in a cell.

In a case where a separator made of a polyethylene is used, it is preferred to use a ultrahigh molecular weight polyethylene in view of high temperature shape-maintaining properties, and the lower limit of the molecular weight is preferably 500,000, more preferably 1,000,000, most preferably 1,500,000. On the other hand, the upper limit of the molecular weight is preferably 5,000,000, more preferably 4,000,000, most preferably 3,000,000, since if the molecular weight is too high, the fluidity tends to be too low, and the pores of the separator may not be clogged when heated in some cases.

The lithium secondary cell of the present invention is produced by assembling the above-described positive electrode of the present invention, a negative electrode and an electrolyte, and a separator which is used as the case requires, into an appropriate shape. Further, as the case requires, it is possible to use another constituting element such as an outer casing.

The shape of the lithium secondary cell of the present invention is not particularly limited, and it may optionally be selected from various shapes which are commonly employed, depending upon the purpose of use. The shape which is commonly employed may, for example, be a cylinder type comprising a sheet electrode and a separator in a spiral form, a cylinder type of an inside out structure having a pellet electrode and a separator combined, or a coin type having a pellet electrode and a separator stacked one on another. Further, the method for assembling a cell is not particularly limited and may optionally be selected from various methods which are commonly employed depending upon the shape of the intended cell.

General embodiments of the lithium secondary cell of the present invention has been described above. However, the lithium secondary cell of the present invention is by no means restricted to the above embodiments, and various modifications are possible unless they exceed the gist of the present invention.

The use of the lithium secondary cell of the present invention is not particularly limited, and the lithium secondary cell of the present invention may be used for various known applications. As specific examples, a notebook computer, a pen input type personal computer, a mobile personal computer, an electric book player, a mobile phone, a portable facsimile, a portable copying machine, a portable printer, a headphone stereo, a video movie, a liquid crystal TV, a handy cleaner, a portable CD, a mini disk, a transceiver, an electronic databook, an electronic calculator, a memory card, a portable tape recorder, a radio, a backup power source, a motor, a luminaire, a toy, a game machine, a clock, a strobe, a camera, and a power source for automobiles, may, for example, be mentioned.

EXAMPLES

Now, the present invention will be explained in further detail with reference to Examples and Comparative Examples.

Production of a Layered Lithium-nickel-based Compound oxide Powder for a Positive Electrode Material for a Lithium Secondary Cell Example 1

Using $Ni(OH)_2$, $Mn_3O_4$ and $Co(OH)_2$ as starting materials, they were weighed so that the molar ratio would be Ni:Mn:Co=0.33:0.33:0.33, and pure water was added thereto to prepare a slurry. This slurry was pulverized by means of a circulation type medium stirring type wet grinding machine (DYNO-MILL KDL-A, manufactured by Shinmaru Enterprises Corporation) with stirring until the average particle size of the solid material in the slurry became 0.15 μm.

Then, the slurry (solid material content 17 wt %, viscosity 810 cp was spray dried) by means of a binary fluid nozzle spray dryer (LT-8 manufactured by OHKAWARA KAKOHKI Co., LTD.). The spray nozzle used was an external mixing type nozzle, and of the concentric nozzle outlets, the inside one was the slurry exit and the outside one was the pressurized gas outlet and the nozzle outer diameter was 3 mm, the slurry exit diameter was 2.3 mm, the clearance at the pressurized gas outlet was 0.2 mm, and the cross-sectional area was 1.76 $mm^2$. The air was used as the drying gas at this time, the drying gas introduction amount G was 25 L/min, the gas linear velocity was 237 m/sec, and the slurry introduction amount S was 39 g/min (gas/slurry ratio G/S=0.64). Further, the drying entry temperature was 120° C.

To the granulated particle powder obtained by the spray drying, a LiOH powder ground to have an average particle size of at most 20 μm was added so that the molar ratio of Li would be 1.05, followed by well mixing. About 13 g of the mixed powder was charged in an alumina crucible and fired at 950° C. under a flow of the air at 9 L/min for 10 hours (temperature raising or decreasing rate of 5° C./min) to obtain a lithium-nickel-manganese-cobalt compound oxide powder having a layered structure having a composition of $Li_{1.05}Ni_{0.33}Mn_{0.33}Co_{0.33}O_2$. The identification of the phase was carried out by a powder X-ray diffraction pattern.

About 10 g of this powder was put in a 10 ml glass measuring cylinder, followed by tapping 200 times, and then the powder packing density (tap density) was measured, and the result was as shown in Table 1. Further, of this powder, the BET specific surface area, the median diameter A of the secondary particles (ultrasonic dispersion for 5 minutes), the primary particle size as observed by SEM, the average primary particle size B and the A/B ratio were as shown in Table 1.

Example 2

The same operation as in Example 1 was carried out to obtain a lithium-nickel-manganese-cobalt compound oxide powder having a layered structure having a composition of $Li_{1.05}Ni_{0.33}Mn_{0.33}Co_{0.33}O_2$ except for the following. A slurry ground until the average particle size of the solid material became 0.17 μm was used, and in the spray drying by the spray dryer, the slurry solid material content was 15.5 wt %, the viscosity was 960 cp, the drying gas introduction amount G was 45 L/min, the gas linear velocity was 426 m/sec, the slurry introduction amount S was 39 g/min (gas/slurry ratio G/S=1.15) and the drying entry temperature was 90° C., and about 256 g of a mixed powder with the ground LiOH powder was charged in an alumina square bowl and fired at 950° C. under a flow of the air at 9 L/min for 12 hours, followed by pulverization, and firing was carried out again at 950° C. for 12 hours.

The values of the physical properties of this powder measured in the same manner as in Example 1 were as shown in Table 1.

Example 3

The same operation as in Example 1 was carried out to obtain a lithium-nickel-manganese-cobalt compound oxide powder having a layered structure having a composition of $Li_{1.05}Ni_{0.33}Mn_{0.33}Co_{0.33}O_2$ except that a slurry ground until the average particle size of the solid material became 0.13 μm was used, and in the spray drying by the spray dryer, the slurry solid material content was 16 wt %, the viscosity was 900 cp, the drying gas introduction amount G was 30 L/min, the gas linear velocity was 284 m/sec, the slurry introduction amount S was 35 g/min (gas/slurry ratio G/S=0.86) and the drying entry temperature was 90° C.

The values of the physical properties of this powder measured in the same manner as in Example 1 were as shown in Table 1.

Example 4

The same operation as in Example 1 was carried out to obtain a lithium-nickel-manganese-cobalt compound oxide powder having a layered structure having a composition of $Li_{1.10}Ni_{0.33}Mn_{0.33}Co_{0.33}O_2$ except that a slurry ground until the average particle size of the solid material became 0.15 μm was used, and in the spray drying by the spray dryer, the slurry solid material content was 14.5 wt %, the viscosity was 1120 cp, the drying gas introduction amount G was 25 L/min, the gas linear velocity was 237 m/sec, the slurry introduction amount S was 38 g/min (gas/slurry ratio G/S=0.66) and the drying entry temperature was 120° C., and the molar ratio of Li of the granulated particle powder obtained by the spray drying would be 1.10.

The values of the physical properties of this powder measured in the same manner as in Example 1 were as shown in Table 1.

Comparative Example 1

The same operation as in Example 1 was carried out to obtain a lithium-nickel-manganese-cobalt compound oxide powder having a layered structure having a composition of $Li_{1.05}Ni_{0.33}Mn_{0.33}Co_{0.33}O_2$ except that in the spray drying by the spray dryer, the slurry solid material content was 17 wt %, the viscosity was 910 cp, the drying gas introduction amount G was 45 L/min, the gas linear velocity was 426 m/sec, the slurry introduction amount S was 10 g/min (gas/slurry ratio G/S=4.50) and the drying entry temperature was 90° C.

The values of the physical properties of this powder measured in the same manner as in Example 1 were as shown in Table 1.

Comparative Example 2

The same operation as in Example 1 was carried out to obtain a lithium-nickel-manganese-cobalt compound oxide powder having a layered structure having a composition of $Li_{1.05}Ni_{0.33}Mn_{0.33}Co_{0.33}O_2$ except that in the spray drying by the spray drier, a slurry having a slurry solid material content of 16 wt %, a viscosity of 900 cp and an average particle size of the solid material of 0.16 μm was sprayed, the drying gas introduction amount G was 45 L/min, the gas linear velocity was 426 m/sec, the slurry introduction amount S was 39 g/min.(gas/slurry ratio G/S=1.15) and the drying entry temperature was 120° C., the ground LiOH powder was added to the granulated particle powder obtained by the spray drying so that the molar ratio of Li would be 1.05, and a $Bi_2O_3$ powder was further added thereto so that the molar ratio of Bi would be 0.005. The identification of the phase was carried out by a powder X-ray diffraction pattern, and in addition to the layered lithium-nickel-manganese-cobalt compound oxide, a $Bi_2O_3$ phase was confirmed.

The values of the physical properties of this powder measured in the same manner as in Example 1 were as shown in Table 1.

Comparative Example 3

The same operation as in Example 1 was carried out to obtain a lithium-nickel-manganese-cobalt compound oxide powder having a layered structure having a composition of $Li_{1.05}Ni_{0.33}Mn_{0.33}Co_{0.33}O_2$ except that in the spray drying by the spray dryer, the slurry solid material content was 12 wt %, the viscosity was 250 cp, the drying gas introduction amount G was 30 L/min, the gas linear velocity was 284 m/sec, the slurry introduction amount S was 40 g/min (gas/slurry ratio G/S=0.75) and the drying entry temperature was 90° C.

The values of the physical properties of this powder measured in the same manner as in Example 1 were as shown in Table 1.

TABLE 1

|  |  | Spray drying conditions | | | Median diameter A of secondary particles (μm) | Primary particle size (μm) | Average particle size B of primary particles (μm) | A/B | BET specific surface area (m²/g) |
|---|---|---|---|---|---|---|---|---|---|
|  |  | Slurry viscosity V (cp) | Gas/Slurry ratio G/S | α value in G/S = αV | Bulk density (g/cc) |  |  |  |  |  |
| Examples | 1 | 810 | 0.64 | 0.00079 | 2.3 | 11.4 | 0.3-0.6 | 0.5 | 23 | 0.90 |
|  | 2 | 960 | 1.15 | 0.00120 | 2.1 | 10.0 | 0.5-1.0 | 0.7 | 14 | 0.69 |
|  | 3 | 900 | 0.86 | 0.00096 | 2.1 | 9.9 | 0.3-0.6 | 0.5 | 20 | 0.82 |
|  | 4 | 1120 | 0.66 | 0.00059 | 2.0 | 10.8 | 0.3-1.0 | 0.5 | 22 | 1.05 |
| Comparative Examples | 1 | 910 | 4.5 | 0.00495 | 1.8 | 6.3 | 0.3-0.6 | 0.5 | 13 | 1.04 |
|  | 2 | 900 | 1.15 | 0.00128 | 2.3 | 11.6 | 1-3 | 1.5 | 8 | 0.37 |
|  | 3 | 250 | 0.75 | 0.00300 | 1.9 | 10.2 | 0.3-1 | 0.7 | 15 | 0.90 |

Preparation and Evaluation of a Cell

Using each of the layered lithium-nickel-based compound oxide powders produced in Examples 1 to 4 and Comparative Examples 1 to 3, a cell was prepared and evaluated by the following method.

(1) Preparation of a positive electrode, confirmation of the initial charge and discharge capacity and rate test:

75 wt % of the layered lithium-nickel-based compound oxide powder produced in each of Examples 1 to 4 and Comparative Examples 1 to 3, 20 wt % of acetylene black and 5 wt % of a polytetrafluoroethylene powder were weighed and thoroughly mixed in a mortar, and formed into a thin sheet, which was punched with a punch of 9 mm in diameter. At this time the total weight was adjusted to be about 8 mg. The punched piece was contact bonded to an aluminum expanded metal to obtain a positive electrode of 9 mm in diameter.

The positive electrode of 9 mm in diameter was employed as a test electrode and a lithium metal plate was employed as a counter electrode, an electrolytic solution having $LiPF_6$ dissolved in a solvent of EC (ethylene carbonate):DMC (dimethyl carbonate):EMC (ethyl methyl carbonate)=3:3:4 (volume ratio) at 1 mol/L was used, and a porous polyethylene film dhaving a thickness of 25 μm was employed as the separator to assemble a coin type cell.

The obtained coin type cell was subjected to a charge and discharge test for two cycles at a constant current of 0.2 mA/cm² at a charge upper limit voltage of 4.3 V and a discharge lower limit voltage of 3.0 V, and then subjected to a test for 3rd to 10th cycles with charging at a constant current of 0.5 mA/cm² with discharging at 0.2 mA/cm², 0.5 mA/cm², 1 mA/cm², 3 mA/cm², 5 MA/cm², 7 mA/cm², 9 mA/cm² and 11 mA/cm², respectively. The initial charge and discharge capacity (mAh/g) at 0.2 MA/cm² at the 1st cycle and the high rate discharge capacity (mAh/g) at 11 mA/cm² at the 10th cycle were measured, and the results are shown in Table 2.

TABLE 2

| Examples | Initial charge and discharge capacity [mAh/g] | High rate discharge capacity [mAh/g] |
|---|---|---|
| Example 1 | 178/161 | 115 |
| Example 2 | 180/160 | 115 |
| Example 3 | 177/164 | 120 |
| Example 4 | 176/160 | 128 |
| Comparative Example 1 | 178/162 | 112 |
| Comparative Example 2 | 175/155 | 90 |
| Comparative Example 3 | 178/159 | 117 |

It is found from Table 2 that according to the present invention, a positive electrode material for a high density lithium secondary cell having a high capacity and excellent in the rate characteristics can be provided. Particularly, in Example 4, the Li molar ratio is 1.10 and the composition is rich in Li, whereby the high rate discharge characteristics are particularly good.

The present invention has been described in detail with reference to specific embodiments, however, it is obvious for the person skilled in the art that various changes are possible without departing from the intention and the scope of the present invention.

The present application is based on a Japanese Patent Application No. 2003-134695 (filed on May 13, 2003), a Japanese Patent Application No. 2003-185175 (filed on Jun. 27, 2003), a Japanese Patent Application No. 2003-377140 (filed on Nov. 6, 2003) and a Japanese Patent Application No. 2004-026943 (filed on Feb. 3, 2004), and their entireties are hereby included by reference.

INDUSTRIAL APPLICABILITY

According to the present invention, by a layered lithium-nickel-based compound oxide powder for a positive electrode material for a high density lithium secondary cell, having a relatively small primary particle size and a large secondary particle size, a lithium secondary cell having a high capacity and excellent in the cell performance such as the rate characteristics can be provided.

What is claimed is:

1. A layered lithium-nickel-based compound oxide powder, which is represented by the following formula (I):

$$Li_{1+x}Ni_{1-y-z-p}Mn_yCo_zM_pO_2 \tag{1}$$

wherein $0<x\leq0.20$, $0.1\leq y\leq0.5$, $0.05\leq z\leq0.5$, $0\leq p\leq0.2$, $0.2\leq y+z+p\leq0.8$, and M is at least one metal capable of suppressing the growth of primary particles of said powder;

wherein the valency of at least some of said Ni is III and at least some of said Li is substituted into a transition metal site (3b);

wherein said powder comprises secondary particles;
wherein said secondary particles are agglomerates of primary particles; and
wherein the ratio A/B of the median diameter, A, of said secondary particles to the average particle size, B, of said primary particles is within a range of from 10 to 200.

2. The layered lithium-nickel-based compound oxide powder according to claim 1, wherein in formula (I) x is at least 0.10.

3. The layered lithium-nickel-based compound oxide powder according to claim 1, wherein the valency of at least some of said Ni is III, whereby the proportion of Ni having the valency of III to Ni having the valency of II is increased and the Ni average valency is increased.

4. The layered lithium-nickel-based compound oxide powder according to claim 1, wherein the valency of at least some of said Ni is III, whereby the electrical conductivity is improved.

5. The layered lithium-nickel-based compound oxide powder according to claim 1, wherein said secondary particles are random agglomerates of said primary particles, and said secondary particles have substantially no crystal anisotropy.

6. The layered lithium-nickel-based compound oxide powder according to claim 1, wherein the average particle size of said primary particles is from 0.1 to 1 μm, and the median diameter of said secondary particles is from 9 to 20 μm.

7. The layered lithium-nickel-based compound oxide powder according to claim 1, which has a bulk density of at least 2.0 g/cm$^3$.

8. The layered lithium-nickel-based compound oxide powder according to claim 1, wherein M is at least one member selected from the group consisting of Al, Fe, Ti, Mg, Cr, Ga, Cu, Zn, Nb and Zr.

9. The layered lithium-nickel-based compound oxide powder according to claim 8, wherein in formula (I) x is at least 0.10.

10. The layered lithium-nickel-based compound oxide powder according to claim 8, wherein the valency of at least some of said Ni is III, whereby the proportion of Ni having the valency of III to Ni having the valency of II is increased and the Ni average valency is increased.

11. The layered lithium-nickel-based compound oxide powder according to claim 8, wherein the valency of at least some of said Ni is III, whereby the electrical conductivity is improved.

12. The layered lithium-nickel-based compound oxide powder according to claim 8, wherein said secondary particles are random agglomerates of said primary particles, and said secondary particles have substantially no crystal anisotropy.

13. The layered lithium-nickel-based compound oxide powder according to claim 8, wherein the average particle size of said primary particles is from 0.1 to 1 and the median diameter of said secondary particles is from 9 to 20 μm.

14. The layered lithium-nickel-based compound oxide powder according to claim 8, which has a bulk density of at least 2.0 g/cm$^3$.

15. A positive electrode, comprising:
a positive electrode active material layer formed on a current collector,
wherein said positive electrode active material layer comprises a binder and at least one lithium-nickel-based compound oxide powder according to claim 1.

16. A lithium secondary cell, comprising:
a negative electrode capable of absorbing and desorbing lithium;
a non-aqueous electrolyte containing a lithium salt; and
a positive electrode according to claim 15.

* * * * *

UNITED STATES PATENT AND TRADEMARK OFFICE
CERTIFICATE OF CORRECTION

| | | |
|---|---|---|
| PATENT NO. | : 7,923,147 B2 | Page 1 of 1 |
| APPLICATION NO. | : 11/979111 | |
| DATED | : April 12, 2011 | |
| INVENTOR(S) | : Kenji Shizuka | |

It is certified that error appears in the above-identified patent and that said Letters Patent is hereby corrected as shown below:

On the title page, Item (54), and column 1, the title is incorrect. Item (54) and column 1 should read:

-- (54) LAYERED LITHIUM-NICKEL-BASED COMPOUND OXIDE POWDER AND ITS PRODUCTION PROCESS --

Signed and Sealed this
Thirty-first Day of May, 2011

David J. Kappos
*Director of the United States Patent and Trademark Office*